(12) United States Patent
Tapadar et al.

(10) Patent No.: US 7,027,989 B1
(45) Date of Patent: Apr. 11, 2006

(54) METHOD AND APPARATUS FOR TRANSMITTING REAL-TIME DATA IN MULTI-ACCESS SYSTEMS

(75) Inventors: Indranil Bob Tapadar, Nepean (CA); Karl D. Mann, Nepean (CA); Chung-Cheung C. Chu, Brossard (CA); Pierre P. Gendron, Laval (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/465,318

(22) Filed: Dec. 17, 1999

(51) Int. Cl.
*G10L 21/04* (2006.01)

(52) U.S. Cl. .................. 704/270; 704/270.1; 704/504; 370/348; 370/319

(58) Field of Classification Search ................ 704/201, 704/208, 210, 214, 215, 221, 503, 504; 370/310.1, 370/319, 320, 321, 337, 347, 344, 433, 435
See application file for complete search history.

(56) References Cited

U.S. PATENT DOCUMENTS

| | | | | |
|---|---|---|---|---|
| 5,436,899 A | * | 7/1995 | Fujino et al. ............... | 704/201 |
| 5,513,183 A | | 4/1996 | Kay et al. ................... | 370/95.3 |
| 5,563,895 A | * | 10/1996 | Malkamaki et al. ........ | 714/748 |
| 5,619,493 A | * | 4/1997 | Ritz et al. ................... | 370/330 |
| 5,648,967 A | * | 7/1997 | Schulz ........................ | 370/328 |
| 5,703,881 A | | 12/1997 | Kay et al. ................... | 370/468 |
| 5,732,356 A | | 3/1998 | Bolt ............................ | 455/462 |
| 5,793,744 A | * | 8/1998 | Kanerva et al. ............ | 370/209 |
| 6,157,653 A | * | 12/2000 | Kline et al. ................. | 370/412 |
| 6,633,840 B1 | * | 10/2003 | Bonnard et al. ............ | 704/229 |

OTHER PUBLICATIONS

Theodore S. Rappaport; Wireless Communications Principles and Practice; Prentice-Hall, Inc; 1996; pp. 361-482.*
Sklar, Bernard; Digital Communications Fundamentals and Applications; Prentice Hall, 1988, pp. 476-486.*
Foo, Schubert; Hui, Siu Cheung; Yip, See Wai; Enhancing the Quality of Low Bit-Rate Real-Time Internet Communication Services; Internet Research Electronic Networking Applications and Policy, vol. 9, No. 3, 1999, pp. 212-224.
Li, San-Qi; Study of Information Loss in Packet Voice Systems; IEEE, 1989, pp. 1192-1202.
Jeong, Seong-Ho; Copeland, John A.; Cell Loss Ratio and Multiplexing Gain of an ATM Multiplexer for VBR Voice Sources; IEEE, 1998, pp. 384-389.
Barry Arons, "Techniques, Reception, and Applications of Time-Compressed Speech" pp. 1 to 9.
Michael A. Nakhla, et al. "Analysis of Tasi System Employing Speech Storage", pp. 49.2.1 to 49.2.8.
David H.A. Black, "PLC-1: Tasi System for Small Trunk Groups", pp. 49.1.1 to 49.1.5.

* cited by examiner

*Primary Examiner*—Abul K. Azad

(57) ABSTRACT

The invention provides a method and apparatus for transmitting real-time data in a multi-access system which eliminates clipping of the data while reducing transmission delays. The invention can be incorporated in any multi-access system where transmission resources are allocated when there is information to transmit. In a preferred embodiment, the invention is incorporated in a multi-access wireless system for the upstream transmission of voice from a mobile station to a base station. Each speech segment received at the mobile is shortened by appropriate editing and buffered until transmission. By editing and buffering speech segments as they are received, clipping can be eliminated while reducing transmission delays.

42 Claims, 7 Drawing Sheets

METHOD AND APPARATUS FOR TRANSMITTING REAL-TIME DATA IN MULTI-ACCESS SYSTEMS

FIELD OF THE INVENTION

This invention relates generally to the transmission of data in multi-access systems and more particularly to a method and apparatus for transmitting real-time data in multi-access systems.

BACKGROUND ART

Over the past few years, various multi-access systems have been developed in response to user demands for systems that can offer ready access to a wide variety of real-time or delay critical packet switched network services. Examples of these services include voice over Internet protocol (VoIP), cable TV or telephony services.

In the vast majority of conventional multi-access systems which provide these types of services, transmission resources are typically assigned to users during periods they actually have information to transmit. For example, in time assigned speech interpolation (TASI) systems where at any given time, multiple users engaged in different audio conversations share a limited number of transmission channels, channels are only allocated to each user during active speech segments or bursts.

When a user initiates a speech segment in these systems, the speech segment is received at a statistical multiplexor which proceeds to allocate channels to transmit the speech segment. When the user enters periods of silence or inactivity, the channels allocated are substantially reduced and typically re-allocated to other users or provisioned for control transmissions. This dynamic allocation of the available transmission resources also known as statistical multiplexing is commonly used in multi-access systems to increase traffic capacity and more importantly, to maximize the use of transmission resources which are often limited.

When a user initiates a new speech segment and switches from a state of inactivity to a state of activity, there is usually some delay before the necessary transmission resources can be allocated. This delay may result in situations where at the beginning of each speech segment, information is sent to a concentrator or multiplexor and is ready to be transmitted but the channel resources necessary for its transmission are not yet available. In conventional systems, the information ready to be transmitted before channel resources become available is typically discarded.

However, because information is discarded, speech segments are clipped at the onset causing information contained therein to be lost. In some systems, it has been shown that segments can be clipped for up to 40 milliseconds. Such clipping can severely disrupt user conversations, particularly where frequent pauses and silence periods occur.

This problem can also arise in multi-access wireless systems providing the same or other types of real-time services. In a multi-access wireless system providing audio services for example, delays in obtaining the appropriate radio resources are inevitable. Because of these delays, video segments or bursts may be clipped. Again, this clipping may as a result substantially damage or distort entire transmissions.

In order to avoid clipping, some multi-access systems delay transmission until channel resources become available. Unfortunately, adding delays to avoid clipping may be inappropriate. For example, adding delays during an audio conversation affect the entire dynamic of the conversation. In wireless systems, these delays considerably disrupt voice transmissions and reduce quality, sometimes below what is considered acceptable.

Therefore, when allocating radio resources in multi-access systems for the transmission of real-time or delay critical data such as, for example, audio or video information, it would be desirable to reduce delays and eliminate clipping to prevent transmission disruptions.

SUMMARY OF THE INVENTION

The present invention addresses these issues and to this end provides a methodology and apparatus to mitigate one or more of the present limitations in this art.

The invention provides a method and apparatus for transmitting real-time data in a multi-access system which substantially eliminates onset clipping of the data transmitted while reducing transmission delays. Generally, the invention can be incorporated in any multi-access system where transmission resources are allocated only when there is information to transmit.

According to a broad aspect, the invention provides a method of transmitting which includes detecting the start of an information segment being generated in real-time, editing and buffering the information segment or a first: representation thereof to produce a second representation and, after transmission resources have been allocated, starting to transmit the second representation whereby the editing and buffering is done to compensate for transmission resource allocation delays.

With respect to this particular aspect, the editing and buffering of the information segment can be performed with or without other processing steps in different sequences including in particular editing first and then buffering or alternatively buffering first and then editing. Further, the editing and buffering can each be done on different representations of the information segment including the information segment as detected or as subsequently coded in frames.

The editing can be performed in a variety of ways including time compressing the segment or removing redundant frames therefrom if the segment is coded in frames first prior to any editing. According to the invention, time compressing the information segment preferably consists of removing repetitions and/or short pauses present in the segment. On the other hand, if the editing consists of removing redundant frames, the redundant frames removed are preferably those which contain repetitions and/or short pauses.

According to another broad aspect, the invention provides an apparatus to transmit information which includes an information detector operable to detect incoming information segments to transmit, an information editor operable to edit each information segment detected so as to produce a respective shortened information segment, a buffer operable to buffer each shortened information segment until transmission resources are allocated to produce a buffered information segment, and a transmitter operable to transmit each buffered information segment.

According to a preferred embodiment, the invention is incorporated in a multi-access wireless system for the upstream transmission of voice from a mobile station to a base station. According to the preferred embodiment, speech data received at the mobile station is edited to discard perceptually insignificant portions of the speech segment as it is received. The edited speech is then buffered to await transmission while the media access control (MAC) protocol layer acquires an allocation of transmission resources. By editing and buffering speech data as it is received, clipping of speech segments can be eliminated while reducing transmission delays.

A variety of techniques may be used to edit and buffer the speech data as it is received to prevent onset clipping and reduce transmission delays. In the preferred embodiment, the speech data received is time-compressed with a speech/pause editor to remove repetitive segments and shorten pauses. The time-compressed speech is then coded in frames and the frames are placed in a buffer to await transmission. According to another preferred embodiment, the speech data received is coded in frames first. A speech frame editor examines the speech frames to discard frames deemed redundant. The frames which are not discarded by the speech frame editor are then placed in a buffer until ready to be transmitted.

Advantageously, by buffering the speech data received until the necessary transmission resources have been allocated, no meaningful speech information is lost and speech segments can be transmitted without any onset clipping. Another advantage of the invention is that by initially editing out perceptually insignificant portions of the speech data as it is received, the segments can be transmitted in a shorter time period to compensate for speech detection and resource allocation delays and reduce transmission delays.

The invention can advantageously be used for a variety of voice services such as for example, Enhanced Data for Global Evolution, voice over Internet Protocol (VoIP) services and audio conferencing. In addition, the invention can also be used for many other real-time services such as video conferencing,

DETAILED DESCRIPTION OF THE PREFERRED EMBODIMENTS

Embodiments of the invention provide a method and apparatus for transmitting real-time data in a multi-access system which eliminates onset clipping of the data transmitted while reducing transmission delays. The invention can be incorporated in any multi-access system in which transmission resources are allocated only when there is information to transmit. For example, the invention can be incorporated in multi-access wireless systems where radio resources used for transmission are allocated to users only during active speech periods.

Figure 1:
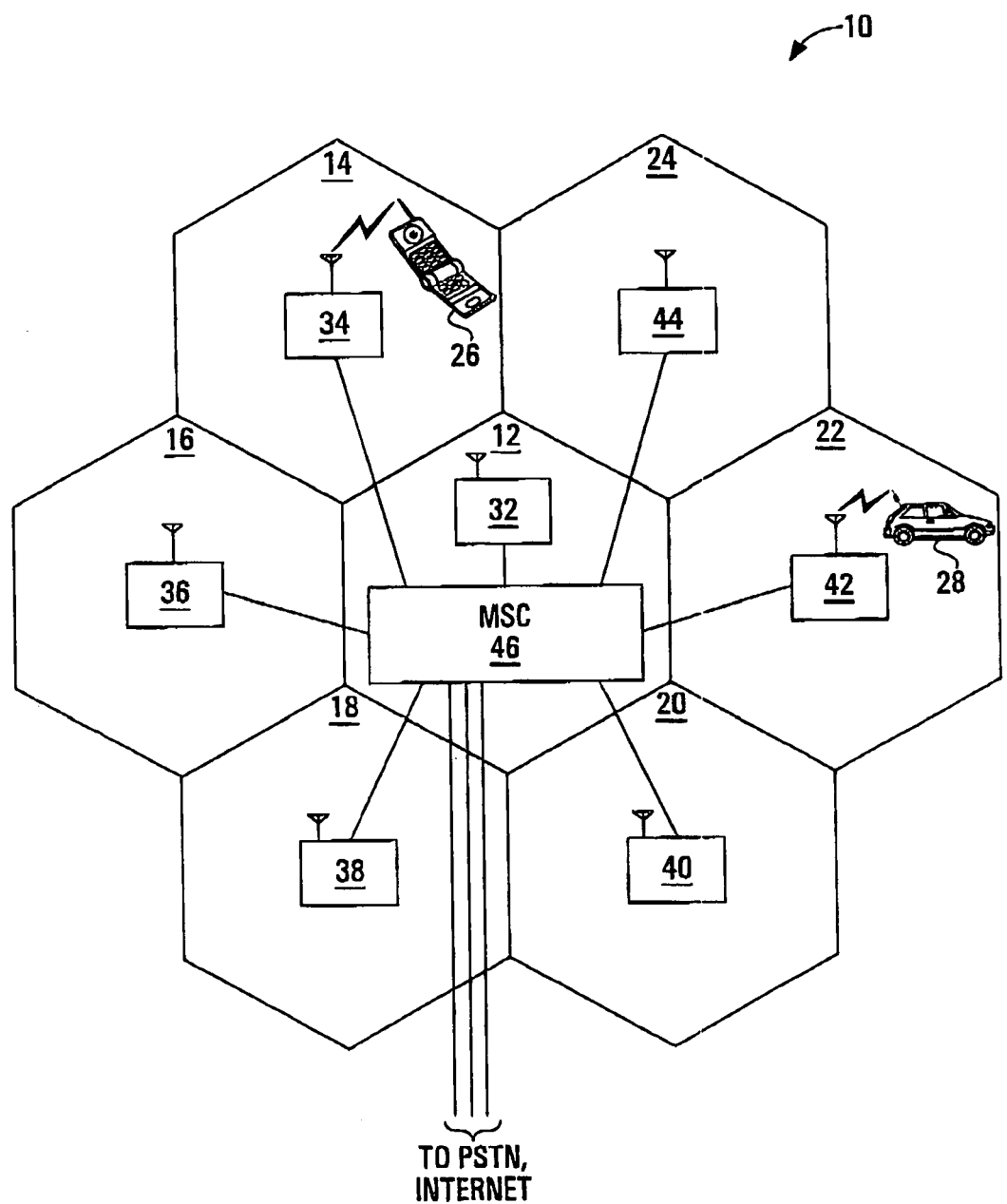
FIG. 1 is a block diagram of a typical multi-access wireless system.

An example of a multi-access wireless system which allocates radio resources only during active speech segments is illustrated in FIG. 1 as generally indicated by 10. In the wireless system 10 shown, radio coverage is divided into cells 12, 14, 16, 18, 20, 22 and 24 (only seven shown) where each cell 12, 14, 16, 18, 20, 22, 24 is assigned a number of available radio frequency (RF) transmission resources. These resources can be for example, fundamental or supplemental channels in code division multiple access (CDMA) or time slots in time division multiple access (TDMA). Generally, the nature of these resources will depend on the type of wireless RF modulation technology employed. For clarity and generality, the resources available for transmission in each cell 12, 14, 16, 18, 20, 22, 24 of the network 10 are hereinafter referred to as transmission resources or simply resources.

Each cell 12, 14, 16, 18, 20, 22, 24 is serviced by a respective base station 32, 34, 36, 38, 40, 42, 44 which is turn is controlled by a mobile switching centre (MSC) 46. The MSC 46 provides external connectivity to other networks and systems such as the Internet or a public switched telephone network (PSTN). Mobile stations 26, 28 (only two shown) communicate over wireless connections with the base station or base stations of the cells in which the mobile stations are located, base stations 34 and 42 in the illustrated example. With these connections, users of the network 10 can have access to standard telephony services or other audio services such as Enhanced Data for Global Evolution or voice over Internet Protocol (VoIP) services.

In each cell 12, 14, 16, 18, 20, 22, 24 of the network 10, upstream and downstream communications are coordinated by the resident base station 32, 34, 36, 38, 40, 42, 44. Each base station 32, 34, 36, 38, 40, 42, 44 controls access to the transmission resources available within their respective cell 12, 14, 16, 18, 20, 22, 24. With this control, the base stations 32, 34, 36, 38, 40, 42, 44 can manage their own downstream transmissions and allocate resources to mobile stations 26, 28 within their cells 12, 14, 16, 18, 20, 22, 24 for the transmission of upstream data with the assistance of the MSC 46 as appropriate.

Generally, in order to transmit upstream data, the mobile stations 26, 28 must request an allocation of transmission resources available within their respective cell 12, 14, 16, 18, 20, 22, 24. Considering upstream communications in cell 14 for example, the mobile station 26 will generally not send any upstream data to the base station 34 unless the base station 34 allocates transmission resources to the mobile station 26 first. To maximize use of the transmission resources available in cell 14, resources are allocated to the mobile station 26 on an information basis i.e. only when the mobile station 26 has active information to transmit or during active speech periods.

When a user initiates a speech segment at the beginning of a call, the mobile station 26 must obtain a resource allocation from the base station 34 before it can begin to transmit the segment. However, the mobile station 26 does not retain the allocation for the entire duration of the call. During periods of inactivity or silence, the base station 34 re-allocates the resources to other users within the cell 14 or for other purposes. This dynamic allocation also known as statistical multiplexing is used for upstream communications in the wireless network 10 to increase traffic capacity and maximize the use of the transmission resources available for upstream data in the cell 14.

The following will now describe the invention in more detail by way of example only in relation to the upstream transmission of voice from the mobile station 26 to the base station 34. It is to be understood that this description also applies upstream transmissions between other mobile stations and base stations present in the network 10.

Figure 2:
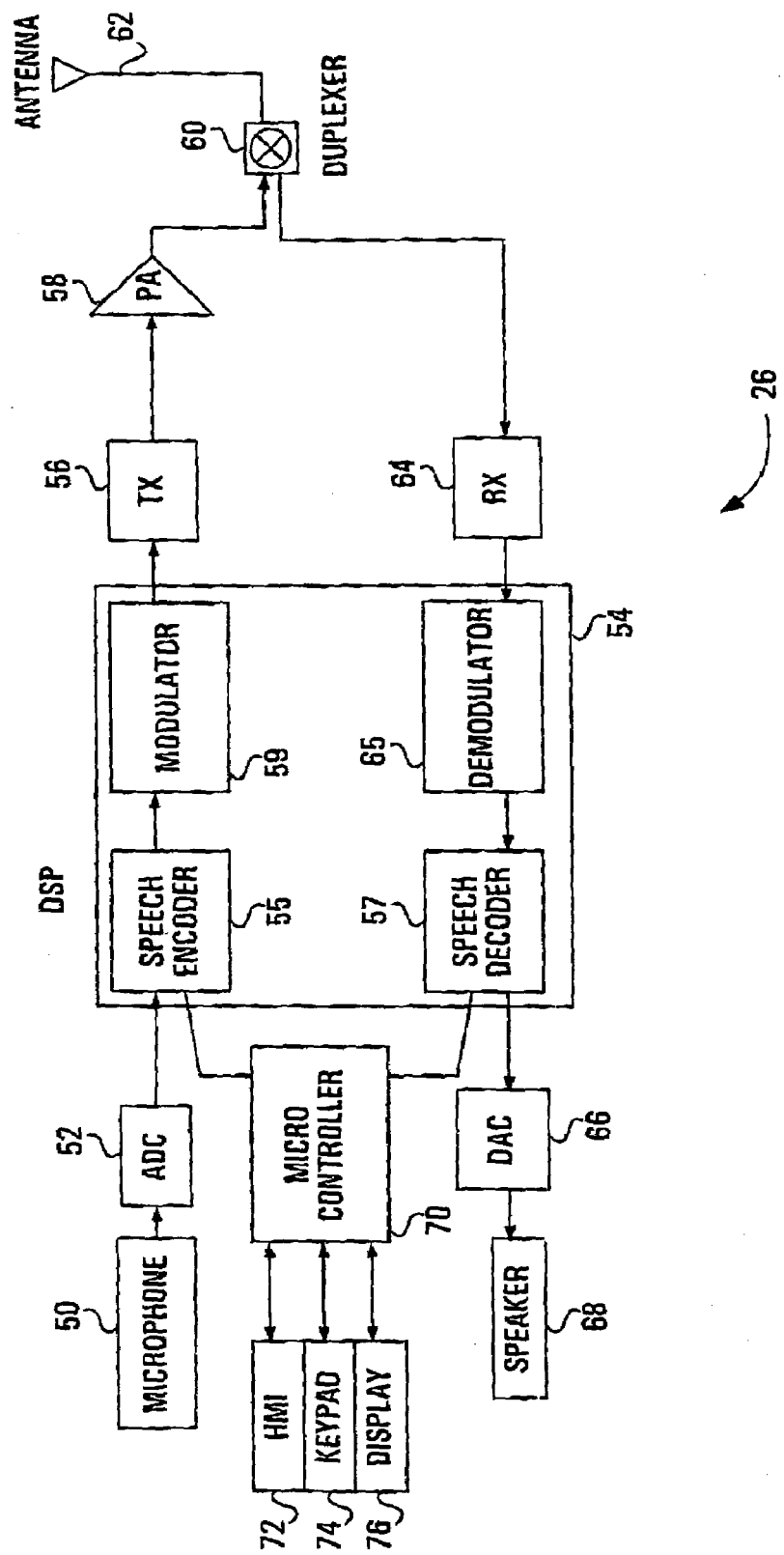
FIG. 2 is a block diagram of a mobile station of the multi-access wireless system of FIG. 1.

FIG. 2 illustrates the mobile station 26 in further detail. As is conventional, the mobile station 26 includes multiple elements and devices which perform various functions including upstream communications, downstream communications, control, user interfacing and call set-up. For upstream communications, the mobile station 26 has a microphone 50, an analog-to-digital converter (ADC) 52, a speech encoder 55 implemented in a digital signal processor (DSP) unit 54 with a modulator 59, a transmitter 56, a power amplifier 58, a duplexer 60 and a radio antenna 62 all interconnected in series. For downstream communications, the mobile station 26 uses the antenna 62 and the duplexer 60 interconnected in series with a receiver 64, a demodulator 65 implemented in the DSP unit 54 with a speech decoder 57, a digital-to-analog converter 66 and a speaker 68. Transmission control is provided toy a micro-controller unit 70 which is connected to the speech encoder 55 and the speech decoder 57 of the DSP unit 54.

According to the preferred embodiment, the speech encoder 55, the modulator 59, the speech decoder 57 and the demodulator 65 may be implemented other than within the DSP unit 54. For example, these components could alternatively be implemented with customized hardware without the need for a DSP unit 54.

In addition, the mobile station 26 also has a number of standard user interface and call set-up elements all controlled by the micro-controller unit 70 which include a human machine interface 72, a keypad 74 and a display unit 76 all interconnected in a standard fashion. These devices are well known in the art and are not described here in any detail.

When a user produces a speech segment at the mobile station 26 during an audio call, the speech is captured in the microphone 50 and digitized by the ADC 52 at a sufficiently high rate (e.g. 8000 8-bit samples per seconds) to digitize the entire user speech spectrum. Upon detecting the digitized speech, the speech encoder 55 of the DSP unit 54 codes the digitized speech data detected and places the coded speech in packets for transmission (further details below). Typically, in so doing, the DSP unit 54 reduces the bit rate to a much lower rate for radio transmission.

At the same time, the speech encoder 55 sends a message to the base station 34 (through the transmitter 56, the power amplifier 58, the duplexer 60 and the antenna 62) requesting transmission resources to transmit the speech segment being received. In response, the base station 34 allocates sufficient resources to the mobile station 26. Preferably, these messages between the mobile station 26 and the base station 34 are exchanged using the media access control (MAC) protocol. In multi-access wireless networks such as the network 10, the MAC protocol is commonly used to co-ordinate and multiplex access to shared transmission resources by multiple users.

When a response allocating transmission resources to the mobile station 26 is received (hereinafter also referred to as the MAC response or the MAC access), the speech encoder 55 begins to process the speech information detected in a manner to substantially eliminate speech clipping (further details below). The speech encoder 55 forwards the processed speech information in the form of packets to the modulator 56 for modulation. In the modulator 56, the packetized data is modulated and then passed to the transmitter 56 for transmission to the base station 34. When the user enters a period of silence or inactivity following the speech segment, the resources allocated for the segment are substantially reduced and re-allocated to other users within the cell 14.

In the wireless system 10 as in most other wireless systems, the resources allocated for transmitting a particular speech segment are not released immediately after the end of the segment. Typically, the resources are "held" for a certain time after the transmission of a speech segment. This holding time can be as long as a few seconds.

When the user initiates a new speech segment and switches from a state of inactivity to a state of activity, there is usually some delay before the speech encoder 55 can detect the speech and proceed to request transmission resources for its transmission. More importantly, when the speech encoder 55 sends an allocation request upon detecting the beginning of a speech segment, there can be a substantial delay before the speech encoder 55 can acquire MAC access and begin transmission of the segment. These delays may result in situations where at the beginning of each speech segment, speech frames are ready to transmit but the resources necessary for their transmission are not yet available.

In conventional wireless systems, the frames ready to transmit before MAC access are typically discarded. However, because these frames are discarded, speech segments are clipped at the onset causing information contained therein to be lost. In some conventional systems, it has been shown that segments can be clipped for up to 40 milliseconds. Such clipping can severely disrupt user conversations, particularly where frequent pauses and silence periods occur.

According to the invention, when a speech segment is detected, the speech encoder 55 proceeds to edit the digitized speech data as it is received from the ADC 52 to remove perceptually insignificant portions. The speech encoder 55 then places the edited speech in a buffer to await transmission until the proper transmission resources have been allocated and the edited speech data can be transmitted. In contrast to conventional transmission methods which clip segments at the onset and can cause as a result important information contain therein to be lost, the present invention removes perceptually insignificant speech portions instead to catch up on the delays incurred in transmitting the information which would otherwise be clipped. According to the invention, the editing is deactivated only when sufficient time savings have been achieved to compensate for the additional time required to buffer and transmit the information which would have otherwise been discarded. As will be explained below in further detail, by editing and buffering the digitized speech data in the speech encoder 55, clipping of speech segments can be eliminated while reducing segment transmission delays.

A variety of techniques may be used to discard perceptually insignificant speech portions and buffer the edited speech data to prevent clipping while reducing segment transmission delays. According to a preferred embodiment, the speech data received is time-compressed with a speech/pause editor to remove repetitive portions and shorten pauses. Then, the time-compressed speech is coded in frames with a speech coder and placed in a buffer to await transmission.

Figure 3:
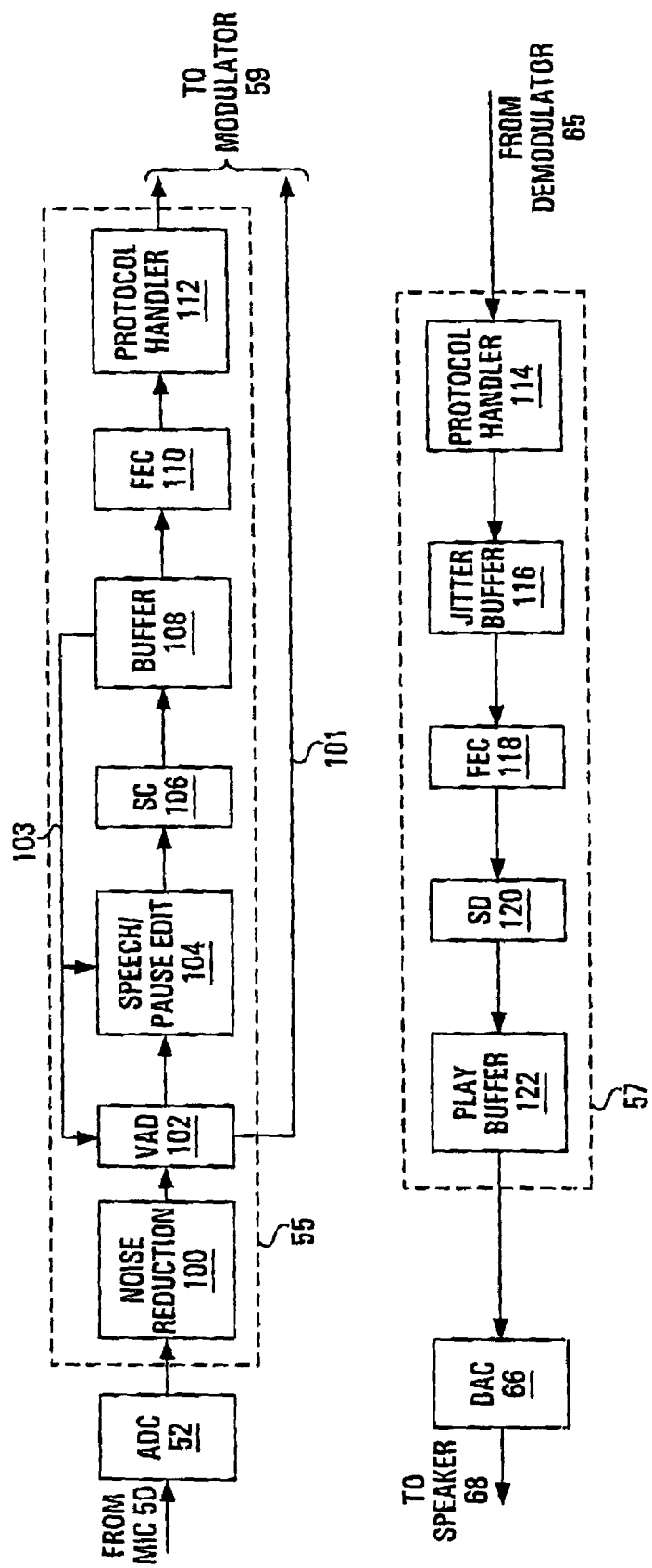
FIG. 3 is a block diagram of the digital signal processor (DSP) block of FIG. 2 showing in particular a speech encoder which edits and buffers speech data according to a preferred embodiment of the invention.

FIG. 3 shows in more detail the DSP unit 54 of FIG. 2 including in particular a preferred embodiment for the speech encoder 55 which can be used to time compress and buffer digitized speech data as it is received from the ADC 52. In this particular embodiment, the speech encoder 55 has an optional noise reduction unit 100 connected to receive the output of the ADC 52. The noise reduction unit 100 is connected in turn to a voice activity detector (VAD) 102. The VAD 102 is directly connected to the transmitter 56 (or a controlling processor) with a line 101 and is also interconnected in series with a speech pause/edit unit 104, a speech coder 106, a buffer 108, an optional frame erasure concealment (FEC) unit 110 and a protocol handler 112. In addition to these interconnections, the buffer 108 is also connected to produce a signal 103 back to the VAD 102 and the speech pause/edit unit 104 while the protocol handler 112 produces its output externally to the transmitter 56.

FIG. 3 also shows a typical embodiment for the speech decoder 57. In this embodiment, the speech decoder 57 has connected to the demodulator 65 a protocol handler 114 which is interconnected in series with a jitter buffer 116, an optional FEC unit 110, a speech decoder 120 and a play buffer 122. The play buffer 122 is in turn externally connected to the DAC 66.

This particular embodiment is merely an example illustrating how the speech decoder 57 can be implemented to support downstream communications with the base station 34 (see FIG. 1). It is to be understood that other implementations are possible. However, the implementation shown in FIG. 3 or any other implementation need not be described here in any further detail as the particular manner in which the speech decoder 57 functions is not material for an understanding of the present invention.

Considering again the speech encoder 55, when digitized speech data is produced by the ADC 52, the digitized data is detected by the VAD 102 which as a result, produces a VAD signal on line 101 denoting the presence of a speech segment. Based on this VAD signal, the transmitter 56 sends an allocation request to the base station 34 to obtain MAC access. The digitized speech data detected by the VAD 102 is immediately forwarded to the speech pause/edit unit 104. After the allocation request has been sent and before a response is received from the base station 34, the speech pause/edit unit 104 proceeds to time compress the speech data received by for example removing repetitive portions present therein and shortening pauses. The time compressed data is then forwarded to the speech coder 106 where it is coded in frames to reduce the speech bit rate (e.g. 64 kbs) to a much lower rate for radio transmission such as for example enhanced full rate codec (ERFC) at 8 kbs. The frames are then stored temporarily in the buffer 108 until transmission.

When a response allocating transmission resources to the mobile station 26 is received from the base station 34, the DSP unit 54 begins to empty the buffer 108 and transmit the frames stored therein. More specifically, after a resource allocation, the frames are forwarded in sequence through the FEC unit 110 to protect against corruption. The frames are then forwarded to the protocol handler 112 where they are placed in packets with one or more frames placed in each packet. The packets are each assembled with an appropriate packet header and sent to the transmitter 56 for transmission to the base station 34.

According to the invention, the transmitter 56 remains operative to transmit speech packets until the VAD 102 detects the end of the speech segment. When this occurs, the VAD 102 sends another VAD signal via line 101 denoting the end of the speech segment to initiate the release of the transmission resources allocated. In the preferred embodiment, the VAD 102 is designed with a high sensitivity threshold such that it does not detect any short pauses or periods of silence between speech syllables. A high sensitivity level will reduce the risk that the VAD 102 mistakenly signals the end of a speech segment which has not completed yet.

However, the resources will only be released when the segment has completed transmission. More specifically, after detecting the end of a speech segment, the VAD 102 will only initiate a release after being notified via line 103 that the buffer 108 is empty and that the speech segment has completed transmission. In the preferred embodiment, the VAD 102 does not initiate releases immediately as the buffer 108 becomes empty but after a hold time period elapses.

According to the invention, the speech pause/edit unit 104 may be operated to compress the speech data received more or less aggressively, depending on how much time must be saved. According to the preferred embodiment, the speech pause/edit unit 104 should be operated sufficiently aggressively to prevent the buffer 108 from overflowing and therefore losing speech information. In the preferred embodiment, the speech pause/edit unit 104 can monitor the state of the buffer 108 via line 103 and adapt its compressing operations accordingly so that the buffer 108 does not overflow.

Further, the speech pause/edit unit 104 should also be operated to provide sufficient time savings to compensate for the additional time required to buffer and transmit frames which would otherwise be discarded if no buffering was used. It can be shown that the additional time required to transmit these frames is equal to the time necessary at the mobile station 26 to acquire resources for transmission. For each speech segment, the speech pause/edit unit 104 should therefore be operated at least long enough to compensate for the resource acquisition time at the mobile station 26. To further reduce transmission delays, the speech pause/edit unit 104 should also be operated long enough to compensate for voice detection delays in the VAD 102.

In other words, the time compression should only be deactivated when the time saved by the speech pause/edit unit 104 is equal or greater than the VAD detection time and the time necessary for the mobile station 26 to acquire MAC access. This can also be expressed in the form of an equation as follows:

$$T_{saved} \geq T_{vad} + T_{acq}$$

where $T_{saved}$ is the total time saved by the speech pause/edit unit 104, $T_{vad}$ is the speech detection time of the VAD 102 and $T_{acq}$ is the time necessary for the mobile station 26 to acquire MAC access for a transmission.

Figure 4:
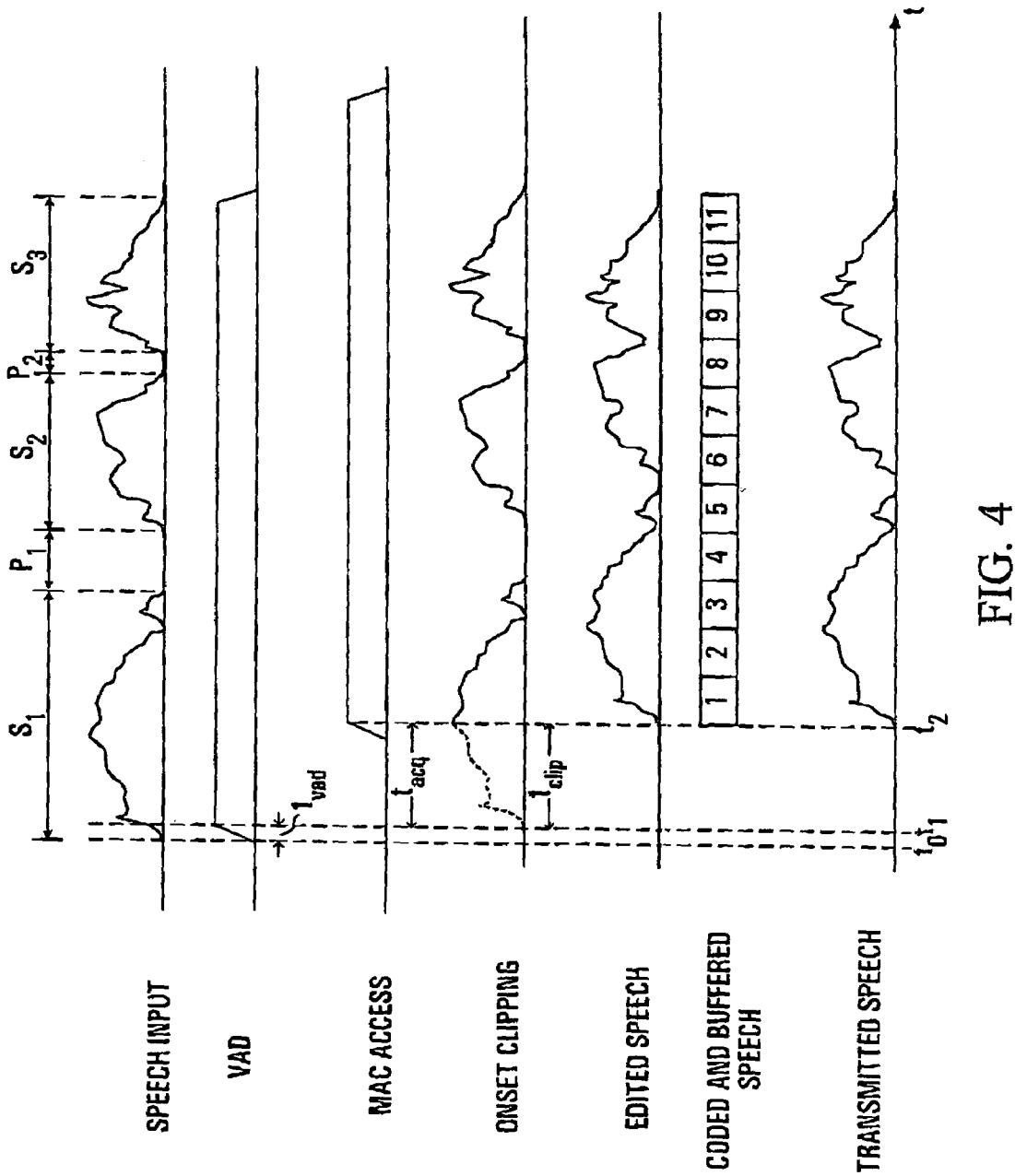
FIG. 4 is a timing diagram showing the editing and buffering of a speech segment by the speech encoder of FIG. 3.

To further illustrate this, reference is made to FIG. 4 where a timing diagram shows as an example the detection, editing and buffering of a speech segment in the speech encoder 55 of FIG. 3 prior to and after its transmission. For clarity, processing delays have been omitted.

The diagram shows labelled as "speech input" the speech segment received by the speech encoder 55. The diagram then illustrates labelled as "VAD" the speech detection in the VAD 102 which occurs after a speech detection time $t_{vad}$. Next, the diagram shows labelled as "MAC access" the subsequent MAC access by the mobile station 26 after a MAC access time $t_{acq}$. For the purpose of comparison, the diagram also shows labelled as "onset clipping" the speech segment clipped for a period $T_{clip}$ to illustrate the onset clipping that would occur before MAC access if the speech input was transmitted according to conventional methods.

The diagram then shows labelled as "edited speech" the speech segment compressed by the speech pause/edit unit 104. Next, the diagram shows labelled as "coded and buffered speech" the speech segment coded and buffered prior to its transmission. Finally, the diagram shows labelled as "transmitted speech" the speech segment as transmitted by the transmitter 56.

Before any editing, coding or buffering, the speech segment (see the speech input) is formed of three active speech portions $S_1$, $S_2$, and $S_3$ separated by short pauses $P_1$ and $P_2$. At time to, the segment is received in the speech encoder 55. Shortly thereafter, at time $t_1$, the VAD 102 detects the segment, generates a VAD signal to initiate a resource allocation request and passes through the speech data detected to the speech pause/edit unit 104 for time compression.

After the VAD 102 detects the speech segment (at time $t_1$) and for a specified period thereafter, the speech pause/edit unit 104 compresses the speech data by removing repetitions in the speech portions $S_1$, $S_2$ and $S_3$ and reducing the pauses $P_1$, $P_2$ (see edited speech). The time compressed speech segment is coded in frames respectively numbered 1 to 11 and stored temporarily in the buffer 108 (see the coded and buffered speech) until MAC access is acquired and the transmitter 56 can begin transmission.

Transmission of the frames begins at time $t_2$ when MAC access is obtained. At this particular time, the frames contained in the buffer 108 are forwarded in sequence to the transmitter 56 where they are placed in packets for transmission to the base station 34.

Prom this Figure, it can be observed that by compressing the speech data for a sufficiently long enough period, the speech encoder 55 can catch up on the delays $t_{vad}$ and $t_{acq}$ introduced by speech detection and MAC access (see transmitted speech). By comparison to conventional transmission methods, speech segments transmitted in accordance with the present invention such as shown in FIG. 4 can be transmitted without inducing any onset clipping while reducing transmission delays.

The foregoing has described a particular method and apparatus for discarding perceptually insignificant portions in a speech segment and buffering the edited speech to prevent clipping and reduce transmission delays. According to the invention, other techniques can be used.

According to a second embodiment of the invention, the speech data received is first coded in frames and then processed by a frame editor which examines the speech frames and discards frames deemed redundant. The frames which are not discarded by the speech frame editor are placed in a buffer until the mobile station 26 acquires MAC access and begins to transmit.

Figure 5:
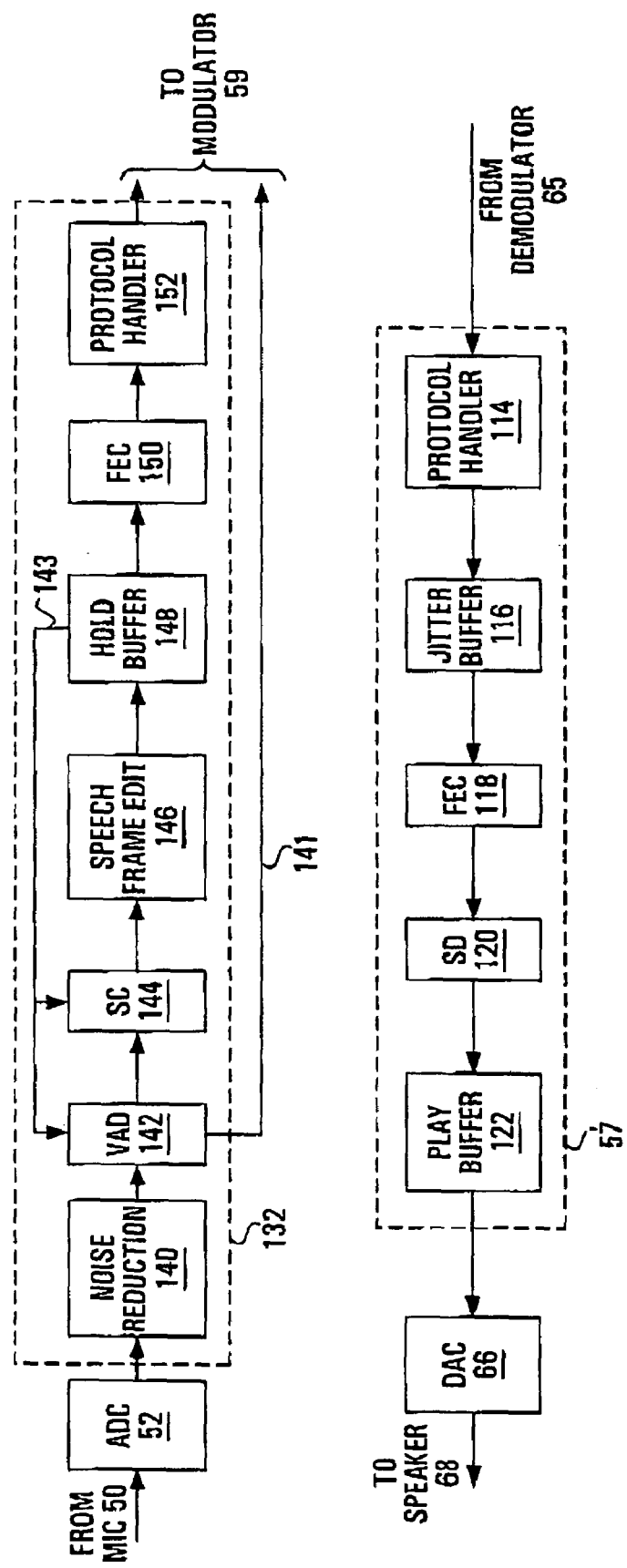
FIG. 5 is another block diagram of the DSP block of FIG. 2 showing in particular a speech encoder which edits and buffers speech data according to another preferred embodiment of the invention.

FIG. 5 shows another detailed diagram of the DSP unit 54 of FIG. 2 showing in particular another speech encoder 132 according to the second embodiment of the invention. Similar to the speech encoder 55 of the first embodiment, the speech encoder 132 of this embodiment also has an optional noise reduction unit 140, a VAD 150, a buffer 148, an optional FEC unit 150 and a protocol handler 152. These elements are interconnected between the ADC 52 and the transmitter 56 in the same manner the optional noise reduction unit 100, the VAD 102, the buffer 108, the FEC unit 110 and the protocol handler 112 of the speech encoder 55 are interconnected. In contrast to the speech encoder 55 however, the speech encoder 132 has between the VAD 150 and the buffer 148 a speech coder 144 interconnected in series with a speech frame editor 146.

In this particular embodiment, when a user initiates a speech segment, the digitized speech data produced by the ADC 52 and passed through the optional noise reduction unit 140 is detected by the VAD 142. Similarly to the VAD 102, the VAD 142 is also designed with a high sensitivity threshold to remove the risk of mistakenly signaling the end of speech segments.

Upon detecting the digitized speech, the VAD 142 sends a VAD signal directly to the transmitter 56 via a line 141 denoting the presence of a speech segment. Based on this VAD signal, the transmitter 56 sends a resource allocation request to the base station 34 to obtain MAC access. The digitized speech data detected by the VAD 102 is sent to the speech coder 144 to be coded into frames and the frames are then forwarded to the speech frame editor 146 for editing.

After the resource allocation request has been sent and before a response is received from the base station 34, the speech frame editor 146 proceeds to remove perceptually insignificant portions in the coded speech by discarding frames which it deems redundant. This could be for example, frames which contain repetitive speech portions or short pauses. The frames which are not discarded by the speech frame editor 146 are then placed in the buffer 148 until the mobile station 26 obtains a resource allocation and can begin transmission of the segment.

When a response allocating transmission resources to the mobile station 26 is received, the frames stored in the buffer 148 are passed through the FEC unit 150 to protect against corruption. After passing through the FEC unit 150, the frames are then forwarded to the protocol handler 152 in sequence where they are placed in packets and sent to the transmitter 56 for transmission to the base station 34.

In this particular embodiment, the speech frame editor 146 should also be operated to provide sufficient time savings to compensate for the speech detection and resource allocation delays. More specifically, the speech frame editor 146 should only be disabled when the time saved $T_{saved}$ is equal or greater than the VAD detection time $t_{vad}$ and the MAC access acquisition time $t_{acq}$ (see above equation for $T_{saved}$).

Figure 6:
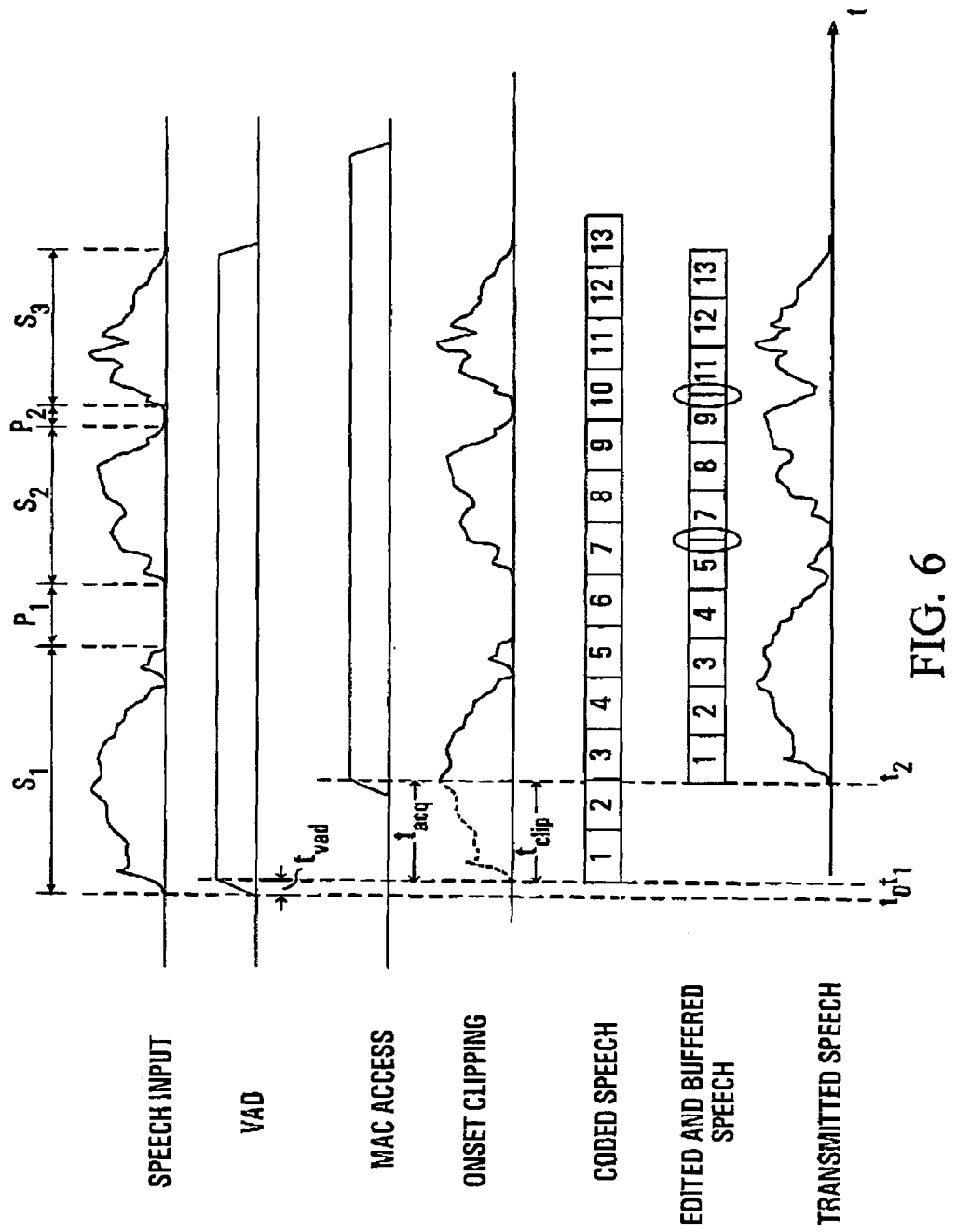
FIG. 6 is a timing diagram showing the editing and buffering of a speech segment by the speech encoder of FIG. 5.

This is further illustrated in FIG. 6 in which a timing diagram shows as an example the speech segment of FIG. 5 as detected, frame edited and buffered by the speech encoder 132 prior to and after its transmission (processing delays omitted). For clarity, this diagram reproduces the speech segment as received by the speech encoder 132 together with the VAD timing of the VAD 142 and the MAC access by the mobile station 26 following the detection of the speech input. In addition, and for the purpose of comparison, the diagram shows labelled as "onset clipping" the speech segment clipped for a period $T_{clip}$ to illustrate the onset clipping that would occur if the speech input in this particular example was transmitted according to conventional methods.

The diagram then shows labelled as "coded speech" the speech segment coded in frames by the speech coder 144. Next, the diagram shows labelled as "edited and buffered speech" the speech segment edited and buffered prior to its transmission. Finally, the diagram illustrates labelled as "transmitted speech" the speech segment as transmitted by the transmitter 56.

As in FIG. 4, the speech segment shown here has three active speech portions S1, S2, and S3 separated by pauses P1 and P2. Again, at time $t_0$, the segment is received in the speech encoder 132. At time $t_1$, the VAD 142 detects the segment, generates a VAD signal for initiating the allocation request to the base station 34 and passes the speech data detected to the speech coder 144. There, the speech is coded in frames. In this particular example, the speech segment is coded in eleven frames respectively numbered 1 to 13.

The frames generated by the speech coder 144 are passed through the speech frame editor 146 which is operative to discard redundant frames in the segment which may contain for example repetitive speech portions or short pauses. In the example shown, frames 6 and 10 are discarded because they contain short pauses. The frames which are not discarded by the speech frame editor 146 are placed in the buffer 148 until the mobile station 26 obtains a resource allocation and can begin transmission of the segment. Again, transmission of the frames begins at time $t_2$ when MAC access is obtained. At this particular time, the frames contained in the buffer 148 are forwarded in sequence to the transmitter 56 where they are placed in packets for transmission to the base station 34.

From this Figure, it can be observed that by discarding redundant frames for a sufficiently long period and providing adequate buffering, the speech encoder 132 can also catch up on the speech detection and resource allocation delays $t_{vad}$, $t_{acq}$ and transmit segments without inducing any onset clipping.

Figure 7:
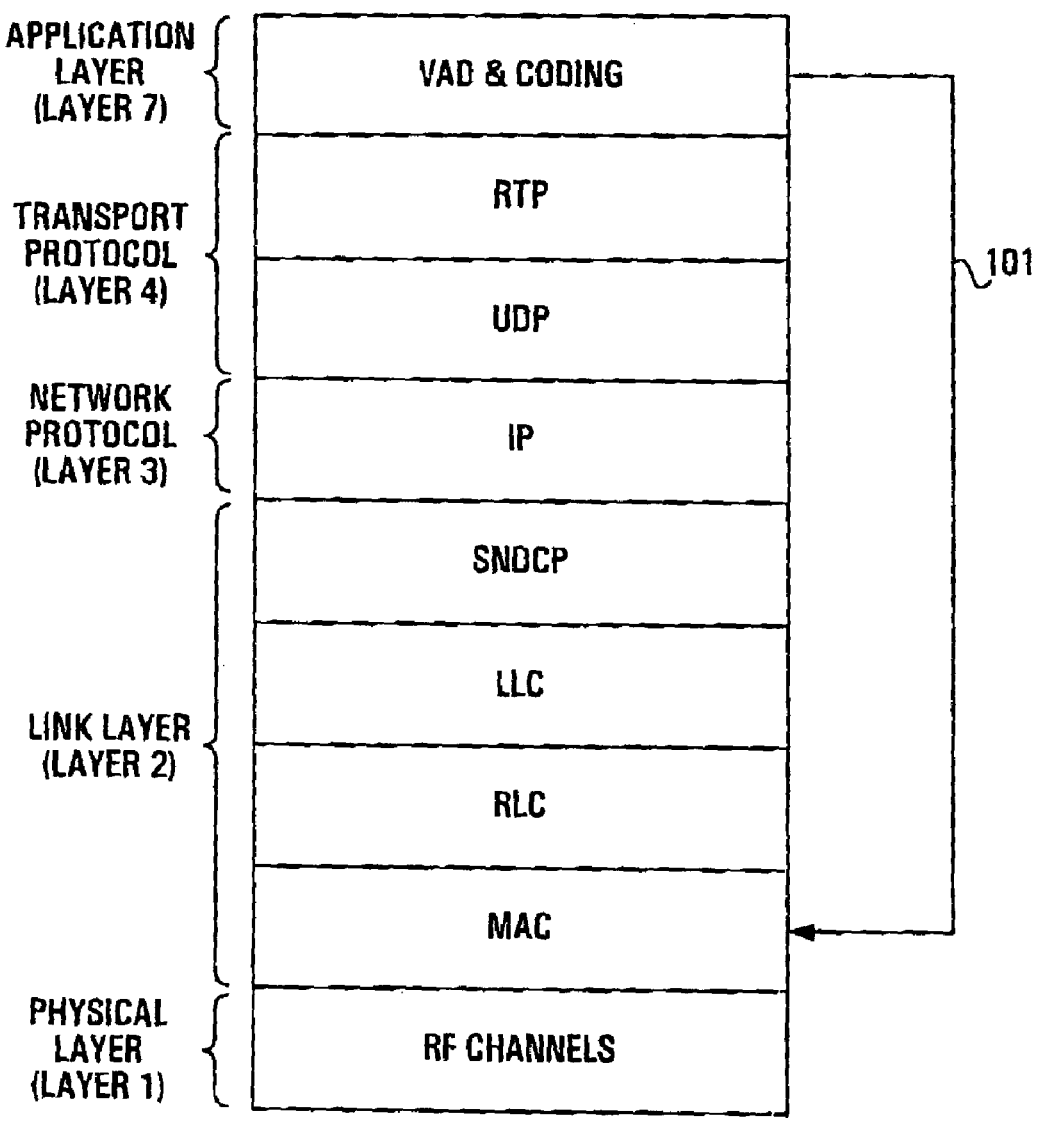
FIG. 7 is a block diagram of a protocol stack used for the transmission of speech data in the multi-access wireless system of FIG. 1.

FIG. 7 illustrates a sample protocol stack that may be used in the network 10 of FIG. 1 to transmit speech segments according to the preferred embodiments of the invention described above. The protocol stack shown in this figure consists of an application layer, a transport protocol layer, a network protocol layer, a link layer and a physical layer. In the well-known open systems interconnection reference (OSI) model, these layers are respectively referred to as layers 7, 4, 3, 2 and 1.

In this particular stack example, the speech detection and coding performed by the speech encoder 55, 132 is implemented in the application layer level (layer 7). In the transport protocol layer (layer 4), the network 10 uses a real-time transport protocol (RTP) and a user datagram protocol (UDP). The RTP protocol is a packet format protocol used in the network 10 to transmit multimedia streams. This particular protocol utilizes existing transport layers for data such as voice which has real-time properties and time constraints. The network 10 also uses a UDP protocol in the transport layer which runs below RTP. UDP is a transport layer protocol which functions as a best effort protocol without guarantee of delivery.

In the network protocol layer (layer 3), the network 10 uses an Internet protocol (IP) for routing user data and control signalling. In the link layer (layer 2), the network 10 uses a subnetwork dependent convergence protocol (SNDCP) to allow transfer of higher network layer protocol data units in a transparent manner. The SNDCP protocol performs multiplexing of these data units for transmission using the service provided by the logical link control (LLC) protocol. The LLC protocol conveys information between layer 3 entities in the mobile stations 26, 28 and else where in the network 10. Below the LLC protocol, the network 10 uses a radio link control (RLC) protocol which defines the procedure for segmentation and re-assembly of layer 2 packet data units. Also used in the link layer is a MAC protocol which multiplexes users onto a shared transmission medium. In each cell 12, 14, 16, 18, 20, 22, 24 of the network 10, this shared transmission medium is consists of transmission resources. In the physical layer (below the MAC protocol), the network 10 has defined all the physical elements used communications in each cell 12, 14, 16, 18, 20, 22 and 24 between mobile stations 26, 28 and base stations 32, 34, 36, 38, 40, 42, 44. This includes transmitters, receivers and the transmission resources used in each cell 12, 14, 16, 18, 20, 22 and 24.

Generally, network devices and elements located in a particular layer only exchange messages with devices or elements located in the same or an adjacent layer. As is conventional, the preferred embodiment of the invention introduces an exception to this with respect to the speech detection by the VAD 102 (or the VAD 142) and more particularly to the generation of a VAD signal by the VAD 102. It will be recalled that the VAD 102 produces a VAD signal 101 to the transmitter 56 to initiate resource allocation requests when speech is detected. Because the VAD 102 must produce this VAD signal directly to the transmitter 56, the application layer in this protocol stack example is shown as being capable of communicating directly to the physical layer.

While the invention has been described with reference to a particular multi-access system, further modifications and improvements to apply the invention in other types of multi-access systems which will occur to those skilled in the art, may be made within the purview of the appended claims, without departing from the scope of the invention in its broader aspect.

Further, the invention has been described above in relation to the upstream transmission of voice from a mobile station to a base station. It is to be understood that the invention could also be used in the downstream transmission of voice from the base station to the mobile station.

More generally, the invention can be used in different multi-access systems for a variety of audio services such as for example, Enhanced Data for Global Evolution and voice over Internet Protocol (VoIP) services. In addition, the invention can also be used for other real-time services such as for example video conferencing services. However, should the invention be used in the transmission of information other than speech, it becomes apparent that there may be elements among those described above which may have to be reconfigured or replaced by components suited to handle the type of information sought to be transmitted.

For example, the VAD 102, the speech pause/edit unit 104 and the speech coder 106 of FIG. 3 are components which are used in relation to the transmission of speech. For other types of information (other than speech), different components performing the same functions but adapted to the particular type of information to transmit would have to be used. It is to be understood that these components could be described more generally as an information detector, an information editor and a coder respectively. Similarly, the VAD 142, speech coder 144 and the speech frame editor 146 of FIG. 5 could also be more generally described as an information activity detector, a coder and an information editor.

Also, the invention is not restricted to the particular protocol stack example described above. It is to be understood that other protocol stacks could be used. A different protocol stack could be used where for example, different protocols are used for communications in the network 10.

The invention has been described above in relation to a particular resource allocation scheme whereby transmission resources are only allocated for active speech segments. It is to be understood that the invention can also be used in multi-access systems with other types of resource allocation mechanisms. For example, the invention can also be used in systems using a pre-emptive mechanism where transmission resources are allocated upon request but with no need for a response.

According to the invention, the steps described above in relation to the processing of each speech segment in the speech encoder are not to be understood to be strictly applied in the order described above. For example, with respect to the steps of editing and buffering, each speech segment can be edited first and then buffered before they are transmitted. Conversely, the segments could each be buffered first and then edited prior to transmission. Further, it is to be understood that processing steps may be performed on different versions of the segments and still fall within the purview of the invention. For example, the editing and buffering steps may be performed before or after the segments are coded in frames.

We claim:

1. A method of transmitting in a multi-access system comprising:
   detecting the start of an information segment being generated in real-time;
   editing and buffering the information segment or a first representation thereof to produce a second representation; and
   after transmission resources have been allocated, starting to transmit the second representation;
   wherein the editing and buffering is done to compensate for transmission resource allocation delays.

2. The method of claim 1 wherein editing and buffering comprises editing and then buffering.

3. The method of claim 2 wherein editing is done on the information segment to produce a shortened information segment.

4. The method of claim 3 wherein buffering is done on the shortened information segment to produce the second representation.

5. The method of claim 3 wherein buffering is done on a frame version of the shortened information segment to produce the second representation.

6. The method of claim 5 wherein editing the information segment to produce a shortened information segment comprises time compressing the information segment.

7. The method of claim 6 wherein time compressing the information segment comprises removing repetitions and/or short pauses present in the segment.

8. The method of claim 2 wherein editing is done on the first representation which is a famed version of the information segment to produce a shortened information segment.

9. The method of claim 8 wherein editing the framed version of the information segment to produce a shortened information segment comprises removing redundant frames.

10. The method of claim 9 wherein removing redundant frames comprises removing frames which contain repetitions and/or short pauses.

11. The method of claim 10 wherein before transmitting the second representation, the method further comprises passing the second representation through a frame erasure concealment unit to prevent corruption.

12. The method of claim 11 wherein before transmitting the second representation, the method further comprises placing the second representation in one or more packets for transmission.

13. The method of claim 1 wherein buffering and editing comprises buffering and then editing.

14. The method of claim 13 wherein buffering is done on the information segment to produce a buffered information segment.

15. The method of claim 14 wherein editing is done on the buffered information segment to produce a shortened information segment.

16. The method of claim 14 wherein editing is done on the first representation which is a framed version of the buffered information segment to produce a shortened information segment.

17. The method of claim 13 wherein buffering is done on the first representation which is a framed version of the information segment to produce a buffered information segment.

18. The method of claim 1 wherein upon detecting the start of the information segment, the method further comprises immediately requesting transmission resources to transmit the information segment.

19. The method of claim 1 wherein before transmitting the second representation, the method further comprises passing the second representation through a frame erasure concealment unit to prevent corruption.

20. The method of claim 19 wherein before transmitting the second representation, the method further comprises placing the second representation in one or more packets for transmission.

21. The method of claim 1 wherein the multi-access system is a multi-access wireless system.

22. The method of claim 21 wherein the information segment is transmitted from a mobile station to a base station.

23. The method of claim 21 wherein the transmission resources consist of one or more information channels.

24. The method of claim 23 wherein each information channel is a radio frequency (RF) channel.

25. The method of claim 1 wherein the information segment is a speech segment.

26. A method according to claim 1 comprising monitoring a state of a buffer containing the information segment or the first representation and performing the editing so that the buffer does not overflow.

27. A method according to claim 1 comprising performing the editing at least long enough to compensate for a resource acquisition time.

28. A method according to claim 1 comprising requesting the transmission resources from the multi-access system and receiving a resource allocation from the multi-access system after the resource allocation delays.

29. An apparatus to transmit information in a multi-acces system, the apparatus comprising:
   an information detector operable to detect incoming information segments to transmit;
   an information editor operable to edit each information segment detected so as to produce a respective shortened information segment;
   a buffer operable to buffer each shortened information segment until transmission resources are allocated to produce a buffered information segment; and
   a transmitter operable to transmit each buffered information segment.

30. The apparatus of claim 29 wherein for editing each information segment detected so as to produce a respective shortened information segment, the information editor is operable to time compress each information segment.

31. The apparatus of claim 29 further comprising a coder connected to the information editor and operable to code each shortened information segment into a respective plurality of frames.

32. A wireless transmitter comprising the apparatus of claim 27.

33. A mobile station comprising the wireless transmitter of claim 32.

34. A mobile station according to claim 33 wherein the information editor is adapted to monitor the state of the buffer and adapt the edit of each information segment detected so that the buffer does not overflow.

35. A mobile station according to claim 33 wherein the information editor is adapted to operate at least long enough to compensate for a resource acquisition time at the mobile station.

36. A mobile station according to claim 33 wherein the information editor is further adapted to request the transmission resources from the multi-access system, the transmission resources being allocated by the multi-access system after resource allocation delays.

37. The apparatus of claim 29 wherein each information segment is a speech segment.

38. The apparatus of claim 37 wherein the information detector is a voice activity detector, the information editor is a speech pause/edit unit and the coder is a speech coder.

39. The apparatus of claim 38 further comprising a frame erasure concealment unit connected to receive each speech segment buffered and operable to prevent corruption before transmission.

40. The apparatus of claim 39 further comprising a protocol handler connected between the frame erasure concealment unit and the transmitter, the protocol handler being operable to place each speech segment buffered in one or more packets for transmission to a node.

41. The apparatus of claim 29 further comprising a coder operable to code each information segment detected into a respective plurality of frames.

42. The apparatus of claim 41 wherein for editing each information segment detected so as to produce a respective shortened information segment, the information editor is operable for each information segment to remove redundant frames from the respective plurality of frames.

* * * * *

UNITED STATES PATENT AND TRADEMARK OFFICE
CERTIFICATE OF CORRECTION

PATENT NO. : 7,027,989 B1  
APPLICATION NO. : 09/465318  
DATED : April 11, 2006  
INVENTOR(S) : Indranil Bob Tapadar et al.

Page 1 of 1

It is certified that error appears in the above-identified patent and that said Letters Patent is hereby corrected as shown below:

Column 9, line 31, the word "Prom" should read --From--;  
Column 13, line 45, "...famed..." should read --...framed...--;  
Column 14, line 29, Claim 23 should depend upon claim --22--;  
Column 14, line 67, Claim 32 should depend upon claim --29--.

Signed and Sealed this

Second Day of October, 2007

JON W. DUDAS  
*Director of the United States Patent and Trademark Office*